US007983412B2

(12) United States Patent
Joseph et al.

(10) Patent No.: US 7,983,412 B2
(45) Date of Patent: *Jul. 19, 2011

(54) SYSTEM AND METHOD FOR AUTOMATING HANDLING OF SLAMMING AND CRAMMING COMPLAINTS

(75) Inventors: Kurt M. Joseph, Austin, TX (US); Robert R. Bushey, Cedar Park, TX (US); Benjamin A. Knott, Round Rock, TX (US); John M. Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/855,087

(22) Filed: Sep. 13, 2007

(65) Prior Publication Data
US 2008/0002821 A1    Jan. 3, 2008

Related U.S. Application Data

(63) Continuation of application No. 10/972,623, filed on Oct. 25, 2004, now Pat. No. 7,272,222, which is a continuation of application No. 10/134,166, filed on Apr. 29, 2002, now Pat. No. 6,853,722.

(51) Int. Cl.
*H04M 3/02* (2006.01)
*H04W 4/26* (2009.01)
(52) U.S. Cl. ............. 379/265.03; 379/88.18; 379/93.12; 379/207.15; 380/231; 382/115; 382/124; 382/125; 455/466; 700/235; 705/1.1; 705/60; 713/181; 713/191; 718/101
(58) Field of Classification Search .................. 379/120, 379/201.05, 201.12, 265.01, 265.03, 265.07, 379/88.18, 93.12, 207.15; 455/405, 466; 705/7, 203, 309, 1.1, 60; 380/231; 382/115, 124, 125; 700/225; 713/181, 191; 718/101
See application file for complete search history.

(56) References Cited

U.S. PATENT DOCUMENTS

| | | | | | |
|---|---|---|---|---|---|
| 5,619,562 | A | * | 4/1997 | Maurer et al. | 379/201.05 |
| 5,668,953 | A | * | 9/1997 | Sloo | 705/309 |
| 5,898,765 | A | * | 4/1999 | Teglovic et al. | 379/120 |
| 5,920,846 | A | * | 7/1999 | Storch et al. | 705/7 |
| 5,937,048 | A | * | 8/1999 | Pelle | 379/201.12 |
| 5,983,091 | A | * | 11/1999 | Rodriguez | 455/405 |
| 6,002,787 | A | * | 12/1999 | Takhar et al. | 382/125 |
| 6,041,104 | A | | 3/2000 | Lipton et al. | |
| 6,061,439 | A | | 5/2000 | Bleile et al. | |
| 6,064,731 | A | | 5/2000 | Flockhart et al. | |
| 6,085,171 | A | * | 7/2000 | Leonard | 705/26 |
| 6,104,798 | A | * | 8/2000 | Lickiss et al. | 379/201.12 |
| 6,115,693 | A | | 9/2000 | McDonough et al. | |

(Continued)

*Primary Examiner* — Gerald Gauthier
(74) *Attorney, Agent, or Firm* — Jackson Walker, L.L.P.

(57) ABSTRACT

A method and system for automating customer slamming and cramming complaints includes an automated reporting system having one or more receiving devices and a complaint module. Customers who want to report a slam or cram access the automated reporting system and report the complaint without having to speak with a customer service representative. The complaint module obtains the customer telephone number and retrieves customer account information using the customer telephone number. Using the customer account information, the complaint module extrapolates a type of complaint for the customer complaint and prompts the customer for information regarding the customer complaint and the type of the complaint. The customer provides customer responses to the prompts and the complaint module provides an indication to the customer regarding each customer response. Once the customer complaint has been resolved, the complaint module stores information regarding the slam or cram for reporting requirements and tracking purposes.

20 Claims, 3 Drawing Sheets

U.S. PATENT DOCUMENTS

| | | | |
|---|---|---|---|
| 6,115,737 A * | 9/2000 | Ely et al. | 709/203 |
| 6,163,607 A | 12/2000 | Bogart et al. | |
| 6,289,111 B1 * | 9/2001 | Takhar | 382/115 |
| 6,327,363 B1 * | 12/2001 | Henderson et al. | 379/265.01 |
| 6,366,665 B1 * | 4/2002 | Hymel et al. | 379/265.03 |
| 6,466,921 B1 * | 10/2002 | Cordery et al. | 705/60 |
| 6,505,051 B1 * | 1/2003 | Alperovich et al. | 455/466 |
| 6,516,056 B1 | 2/2003 | Justice et al. | |
| 6,539,480 B1 * | 3/2003 | Drews | 713/191 |
| 6,654,779 B1 * | 11/2003 | Tsuei | 718/101 |
| 6,735,311 B1 * | 5/2004 | Rump et al. | 380/231 |
| 6,912,660 B1 * | 6/2005 | Petrogiannis | 713/181 |
| 7,272,222 B2 * | 9/2007 | Joseph et al. | 379/265.07 |
| 7,890,208 B2 * | 2/2011 | Pintsov et al. | 700/225 |
| 2001/0053239 A1 * | 12/2001 | Takhar | 382/124 |
| 2003/0202643 A1 * | 10/2003 | Joseph et al. | 379/88.18 |
| 2005/0058264 A1 * | 3/2005 | Joseph et al. | 379/88.18 |
| 2008/0002821 A1 * | 1/2008 | Joseph et al. | 379/265.03 |

* cited by examiner

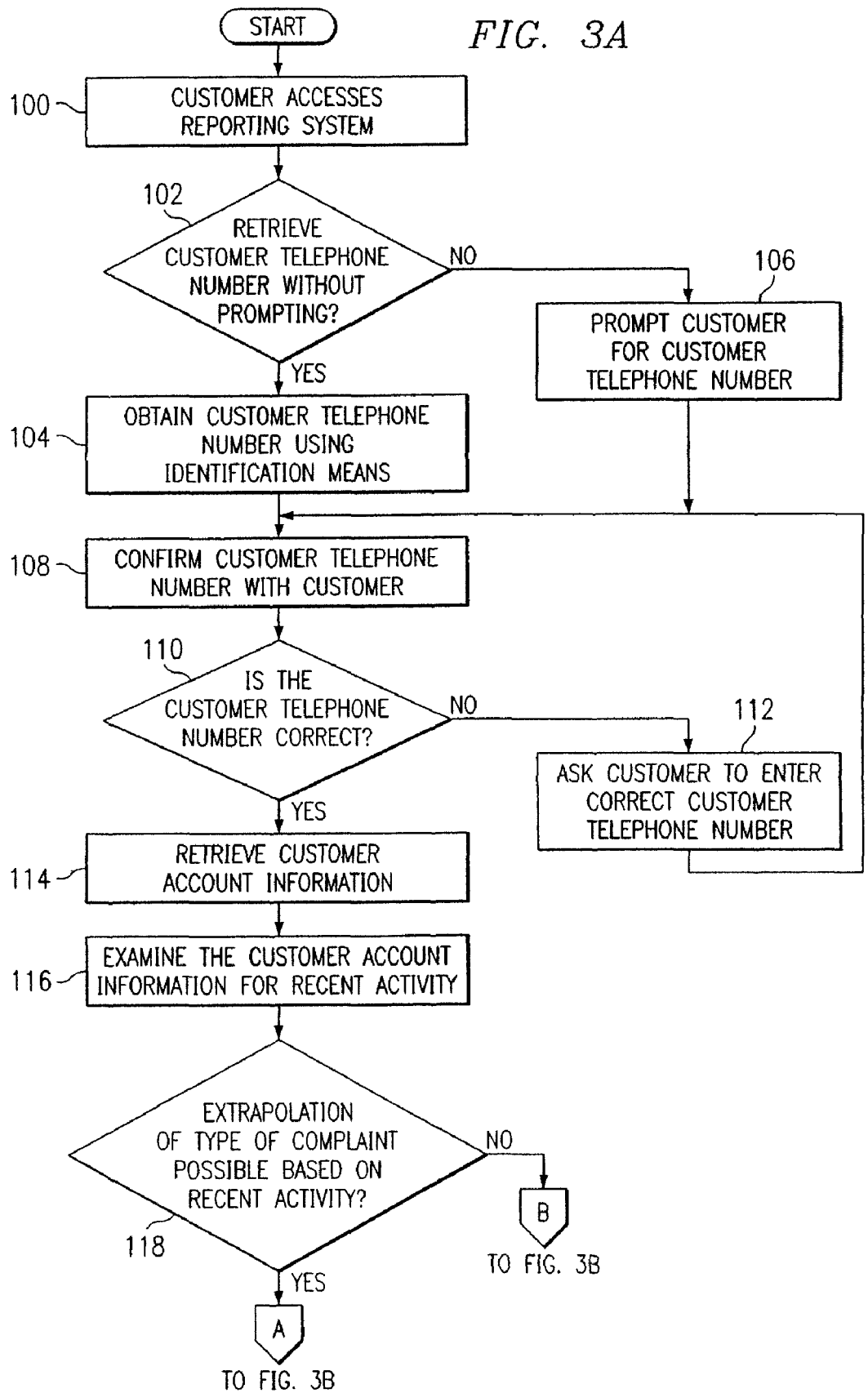

SYSTEM AND METHOD FOR AUTOMATING HANDLING OF SLAMMING AND CRAMMING COMPLAINTS

RELATED APPLICATION

This application is a continuation of U.S. patent application Ser. No. 10/972,623, filed Oct. 25, 2004 now U.S. Pat. No. 7,272,222, which is a continuation of U.S. patent application Ser. No. 10/134,166, filed Apr. 29, 2002, now U.S. Pat. No. 6,853,722 B2, the contents of both of which are hereby incorporated in their entirety by reference.

TECHNICAL FIELD OF THE INVENTION

The present invention relates generally to telephone services, and more specifically relates to the automation of customer slamming and cramming complaints in providing a telephone service.

BACKGROUND OF THE INVENTION

One of the fastest growing customer complaints with respect to telephone services regards slamming and cramming. Slamming is the illegal practice of changing a customer's local or long distance telephone service provider without the permission of the customer. Cramming is the practice of placing unauthorized, misleading, or deceptive products, services, or charges on customers' telephone bills without customer permission. Under Federal Communications Commission (FCC) regulations, telephone companies are required to track, record, and report customer complaints of alleged slamming and cramming.

When a customer suspects a slam or cram, the customer typically calls a customer service representative (CSR) for the customer's telephone company to report the incident and seek corrective measures. Typically, the CSR solicits pertinent information from the customer regarding the alleged slam or cram and enters information regarding the slam or cram into a database in order to track the slamming and cramming complaints and therefore remain in compliance with FCC regulations. Although this is not a difficult task, it is costly and time consuming for the telephone companies because tracking, recording, and reporting alleged slams and crams consumes CSR time that could be better utilized in revenue producing services or in customer satisfaction services.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein.

DETAILED DESCRIPTION OF THE INVENTION

Figures 1, 2:
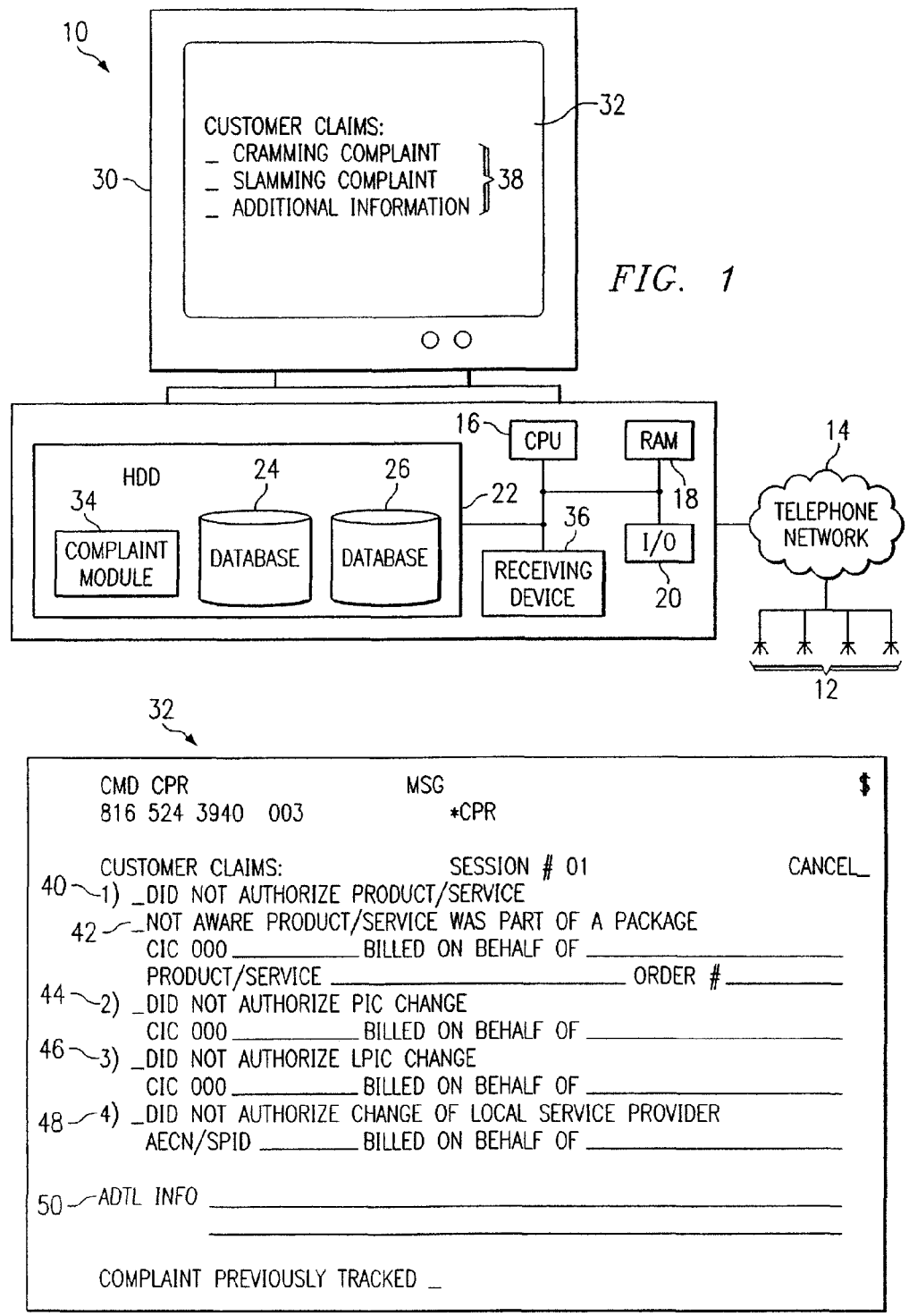
FIG. 1 depicts a block diagram of a system for automating customer slamming and cramming complaints.
FIG. 2 illustrates an example complaint interface.

Preferred embodiments of the present invention are illustrated in the figures, like numerals being used to refer to like and corresponding parts of the various drawings.

State and federal regulations require all customer complaints of alleged slamming and cramming to be tracked regardless of the telephone company against whom the complaint is made. The telephone companies generally generate monthly reports regarding the alleged slamming and cramming complaints and these reports provide the telephone companies with the information needed to remain in compliance with the state and federal regulations. Because telephone companies are required to track all alleged slamming and cramming complaints, dealing with customer slamming and cramming complaints occupies a large amount of both a telephone company's time and money particularly with respect to the time the customer service representatives (CSR) spend dealing first hand with the customers and the customer complaints.

A customer generally becomes aware of an alleged slam or cram when the customer receives and reviews his or her telephone bill. With respect to slamming, the customer may notice that the provider of one of their telephone services has changed without customer authorization. Different types of slamming that a customer may wish to report include: long distance slamming where the customer's interLATA (Local Access and Transport Areas) long distance provider, also known as the PIC (Primary Interexchange Carrier), has been changed; a local toll slamming where the customer's intraLATA local toll carrier, also known as the LPIC (Local Primary Interexchange Carrier), has been changed; or a local dial tone or service slamming where the customer's local service provider, also known as the local dial tone provider, has been changed.

A customer typically notices a cramming because the amount due on the customer's telephone bill is generally higher than the customer expected to pay or the telephone bill includes products or services that the customer did not order. Crammings generally encompass two different varieties. One type of cramming is when a service, such as Caller ID or Call Waiting, is added to a customer's telephone account without the customer authorizing such addition. Here the customer is aware of the service but did not authorize such service. Another type of cramming is when the customer authorized a package of products or services but was not aware that a particular product or service was part of an authorized package. For example, many telephone companies offer packages where two or more services are offered together at a discounted price. A telephone company may offer a package that includes the services of Call Waiting, Caller ID, and Call Forwarding, and the telephone company may charge the customer a reduced fee for that package, relative to the total otherwise charged for the individual services. For instance, Southwestern Bell Telephone Company Corporation (Southwestern Bell) offers a package of services under the registered service mark "The ESSENTIALS." A customer may order such a package not realizing what services are included in the package. So when the customer receives the telephone bill and notices a charge for Call Forwarding, the customer may think he or she was crammed because the customer did not individually order Call Forwarding and is not aware that the package that the customer did order includes Call Forwarding. This type of cramming is where the customer authorized the package including the service but was just unaware that the service was part of a package.

Given that unauthorized changes may be made after a telephone bill has been sent to the customer and because customers have a tendency to not closely examine their telephone bill, several billing cycles may pass before a slam or cram shows up on a customer's bill or before a customer notices a slam or cram.

When a customer notices an alleged slam or cram on his or her telephone bill, she typically calls a customer service support telephone number to report the slam or cram and correct any inaccuracies within the customer account. The customer speaks with a CSR who asks various questions of the customer and records the customer's responses. The CSR corrects any changes to the customer's account that were not authorized by customer. These changes may involve switching the customer back to the customer's selected telephone service provider or removing any unwanted telephone services added without customer authorization. The CSR records the information regarding the alleged slam or cram in a manner that allows the telephone company to track the slamming and cramming complaints.

Because of the cost associated with CSR time, companies have begun to automate or partially automate some of their customer service functions. These automated systems that provide customer service functions without CSR contact have become important to many companies. The automated systems are designed to give customers the option of completing tasks without the assistance of a CSR. Customers typically have the option of speaking with a CSR while using an automated system but many tasks can be completed by the customer without ever speaking to a CSR. Because less CSR time is required, automated systems result in cost savings for the company due to the reduction in required customer service staffing needs and possibly increased revenues due to the fact that CSRs may be reassigned to provide revenue producing customer services.

In contrast, the example embodiment described herein allows for the automation of the reporting of customer slamming and cramming complaints. Additionally, the example embodiment allows customers to report slamming and cramming complaints without having to speak with a CSR unless the customer wants to speak with a CSR. The automation is to the benefit of many customers who prefer not to have to speak to a CSR or for customers who cannot place a call during regular business hours but still need to report a slamming or cramming. Also, the automation may reduce customer hold times. The ability of a customer to report a slamming or cramming complaint and receive correction action with respect to the customer complaint without having to speak with a CSR saves valuable CSR time and also allows for the successful collection and tracking of customer slamming and cramming complaints thereby allowing for compliance with state and federal regulations. Because CSR time is not occupied with collecting information regarding customer slamming and cramming complaints, CSR staffing may be reduced and CSRs may be redirected to more revenue producing customer services resulting in reduced costs and increased revenues.

Referring now to FIG. 1, a block diagram depicts reporting system 10 for automating customer slamming and cramming complaints. Customers interface with reporting system 10 through telephones 12 and telephone network 14, such as the public switched telephone network or other telephonic communication systems like voice over internet protocol based systems. Although the embodiment in FIG. 1 shows only four telephones 12, in alternate embodiments reporting system 10 may interface with more than four or less than four telephones 12.

In the example embodiment, reporting system 10 may include respective software components and hardware components, such as processor 16, memory 18, input/output ports 20, hard disk drive (HDD) 22 containing various databases 24 and 26, and those components may work together via bus 28 to provide the desired functionality. The various hardware and software components may also be referred to as processing resources. Reporting system 10 may be a personal computer or server with a network interface for communicating over networks such as the telephone communication networks, the Internet, intranets, LANS, or WANS. Reporting system may also include display 30 for presenting complaint interface 32 and input devices such as a mouse and a keyboard. Complaint interface 32 includes data fields 38 and is illustrated in greater detail in FIG. 2. Reporting system 10 also includes complaint module 34 which resides in hard disk drive 22 and is executable by processor 16 through bus 28 as well as receiving device 36.

Receiving device 36 communicates with I/O ports 20 via bus 28 and in alternate embodiments there may be more than one receiving device 36 in reporting system 10. One such type of receiving device is an automatic call distribution system ("ACD") that receives plural inbound telephone calls and then distributes the inbound telephone calls to CSRs or automated systems. Another type of receiving device is a voice response unit ("VRU") also known as an interactive voice response system ("IVR"). When a call is received by a VRU, the caller is generally greeted with an automated voice that queries the caller for information and then routes the call based on the information provided by the caller. When inbound telephone calls are received, typically VRU and ACD systems employ identification means to collect caller information such as automated number identification ("ANI") information provided by telephone networks that identify the telephone number of the inbound telephone call. In addition, VRUs may be used in conjunction with ACDs to provide customer service.

When a customer has a complaint regarding slamming or cramming, information regarding the complaint must be entered into complaint interface 32. Information entered into complaint interface 32 regarding the slam or cram is compiled to generate slamming and cramming reports required by state and federal regulations. Reporting system 10 allows for the automated entry of information into complaint interface 32.

Complaint interface 32 includes different data fields 38 depending on whether the customer wishes to report a slam or cram. Data fields 38 allow for specific information regarding the slam or cram to be recorded in a manner that allows for compliance with state and federal regulations. Data field 40 is for cramming complaint information when a product or service has been added to a customer's account without the customer's authorization. Data field 42 is for cramming complaint information where the customer has ordered a particular product or service as part of a package but is not aware that the product or service is part of the ordered package. Data fields 44, 46, and 48 are for information regarding slamming complaints. Data field 44 is for an unauthorized change of a PIC, data field 46 is for an unauthorized change of an LPIC, and data field 48 is for an unauthorized change of the local service provider. Data field 50 is for any additional information regarding the slamming or cramming that may be important and therefore need to be reported.

In addition to the type of complaint, each data field 40, 42, 44, 46, and 48 requires the entry of a CIC (carrier information code) code identifying the offending party or company and the offending product or service that was the cause of the unauthorized change to the customer's telephone service. Reporting system 10 allows for the customer to enter information into complaint interface 32 instead of the CSR thereby freeing up CSR time for other activities or for allowing a reduction in CSR staffing needs.

Figure 3B:
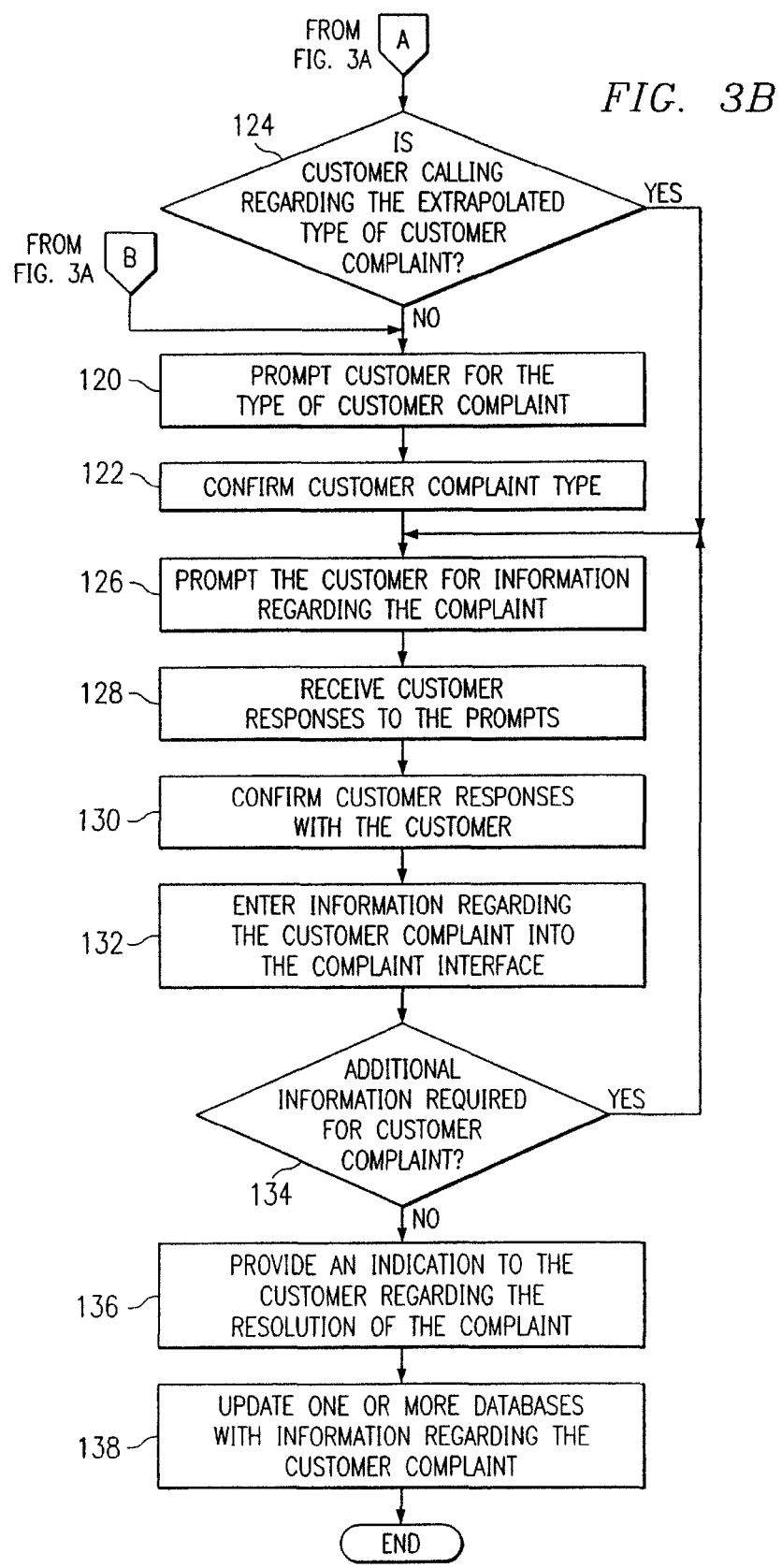
FIG. 3 depicts a flow diagram of a method for automating customer slamming and cramming complaints.

FIG. 3 depicts a flow diagram of a method for automating customer slamming and cramming complaints. The method begins at step 100 when a customer wishes to report an alleged slamming or cramming. The customer dials a customer service telephone number using telephone 12 and connects via telephone network 14. The customer's telephone call may be answered by reporting system 10 via receiving device 36 and complaint module 34 which provides a greeting to the customer. In alternate embodiments, the customer may be routed to reporting system 10 via receiving device 36 where receiving device 36 may be a call routing IVR or the customer's telephone call may be answered directly by a CSR. If the customer's telephone call is answered directly by a CSR, once the CSR learns that the customer is calling in regards to an alleged slamming or cramming complaint, the CSR transfers the customer to reporting system 10 and receiving device 36 so that the customer may report the alleged slamming or cramming using the automated reporting system 10.

After receiving device 36 receives the customer's telephone call regarding the customer complaint, then at step 102 complaint module 34 determines if the customer telephone number is obtainable without prompting the customer to provide the customer telephone number. The customer telephone number is obtainable without prompting the customer if receiving device 36 is enabled to employ identification means such as ANI to determine the telephone number that the customer is calling from. If complaint module 34 is able to obtain the customer telephone number without prompting, then at step 104 complaint module 34 obtains the customer telephone number. If at step 102 complaint module 34 is unable to obtain the customer telephone number without prompting, then at step 106 complaint module 34 prompts the customer to provide the customer telephone number and complaint module 34 receives the customer's response regarding the customer telephone number. Complaint module 34 interfaces with the customer using a speech recognition interface so that the customer only has to speak the customer responses, such as the customer telephone number, instead of entering the customer telephone number using touch tone input.

Once complaint module 34 has obtained the customer telephone number, at step 108 complaint module 34 confirms with the customer that the customer telephone number is correct and that it is the telephone number for which the customer receives service. If the customer telephone number is correct at step 110 then the process proceeds to step 114. If the customer telephone number is not correct at step 110, then at step 112 complaint module 34 again prompts the customer to provide the customer telephone number for which the customer receives telephone services. Complaint module 34 repeats steps 108, 110, and 112 until complaint module 34 has the correct customer telephone number and before proceeding to step 114. Alternatively instead of repeating steps 108, 110, and 112, reporting system 10 may transfer the customer to a CSR after a predetermined number of failed attempts at providing the customer telephone number to prevent customer frustration.

When complaint module 34 has the correct customer telephone number, at step 114 complaint module 34 retrieves the customer account information using the customer telephone number by tying the customer telephone number to the customer account information. Complaint module 34 retrieves the customer account information by accessing hard disk drive 22 and databases 24 and/or 26 to retrieve a plurality of customer account information. Complaint module 34 performs a database look-up of databases 24 and/or 26 using the customer telephone number to locate the customer account information. The customer account information includes such information as the name and address of the customer, order history, account activity, product and services ordered, CIC codes for local and long distance service providers, names of local and long distance service providers, payment history, billing codes, and any other appropriate information regarding the customer's telephone services.

After complaint module 34 has retrieved the customer account information, at step 116 complaint module 34 examines the customer account information looking for indicators as to why the customer may be calling or the type of complaint the customer is reporting. Complaint module 34 examines the customer account information looking at recent order activity or changes to the account paying particular attention to changes to the local or long distance providers and the addition of new products or services. Complaint module 34 typically examines the customer account information for the previous six months but may examine less than six months or more than six months.

Once complaint module 34 has examined the customer account information, at step 118 complaint module 34 determines if it can make an extrapolation as to the type of customer complaint that the customer is calling about—whether it be slamming or cramming. Complaint module 34 extrapolates as to the type of customer complaint based on the recent activity in the customer account information. For example, if the customer account information indicated that the customer's long distance provider was switched two weeks ago, complaint module 34 extrapolates that the customer is calling regarding the recent change in long distance service provider which is possibly a slam. Or if the customer account information indicates that both Caller ID and Call Waiting were added to the customer's telephone service last month, complaint module 34 extrapolates that the customer is calling regarding the added services which is possibly a cramming. Complaint module 34 may not be able to extrapolate as to the type of customer complaint if for instance the customer account information shows no activity for the last six months or if the customer account information reveals a large amount of recent activity.

If at step 118 complaint module 34 is unable to extrapolate the type of customer complaint based on recent account activity, then at step 120 complaint module 34 prompts the customer for the type of customer complaint the customer is calling about. The customer supplies that type of customer complaint, either slamming or cramming, and at step 122 complaint module 34 confirms the type of customer complaint with the customer and the process continues to step 126.

If at step 118 complaint module 34 is able to extrapolate as to the type of customer complaint, then at step 124 complaint module 34 alters the customer prompt based on the extrapolated type of customer complaint and prompts the customer asking if the customer is calling about the extrapolated type of customer complaint. For instance, if complaint module 34 extrapolated that the customer was calling about a slamming complaint based on a change in long distance provider made two weeks ago, then at step 124 complaint module 34 prompts the customer asking if the customer is calling in regard to the change of long distance service provider and a possible slamming. Or if there has been a recent addition of several products and services, complaint module 34 prompts the customer by asking if the customer is calling in regards to the possible cramming of additional products and service. If the extrapolation as to type of customer complaint is correct as indicated by the customer response to the prompt at step 124, then the process continues to step 126. If the extrapolation as to the type of customer complaint is incorrect at step 124, then process returns to steps 120 and 122 where complaint module 34 prompts the customer for the type of customer complaint as explained above.

Once complaint module 34 has determined the correct type of customer complaint either through extrapolation or directly prompting the customer, at step 126 complaint module 34 begins to prompt the customer for specific information regarding the customer slamming or cramming complaint, receives customer response to the above prompts at step 128, confirms the customer responses with the customer at step 130, and enters information regarding the customer complaint into data fields 38 of complaint interface 32 at step 132. At step 134, complaint module 34 determines if additional information is needed from the customer regarding the customer complaint in order to provide data for all the required data fields 38 of complaint interface 32. If additional information is needed, then steps 126, 128, 130, and 132 are repeated until complaint module 34 has all the necessary information as required by complaint interface 32. Once complaint module 34 has all the required information regarding the customer complaint, the process continues to step 136.

The prompts that complaint module 34 asks of the customer at step 126 vary with the type of customer complaint. If the customer is reporting an alleged cramming, complaint module 34 needs to determine whether the allegedly crammed product or service was added without customer authorization or it the product or service was authorized by the customer as part of a package but the customer was not aware that it was part of the package. Once the type of cramming has been identified, complaint module 34 then needs to prompt the customer as to how the customer wants to resolve the complaint and then follow through with the customer's instructions.

With respect to slamming customer complaints, complaint module 34 needs to determine whether the PIC, LPIC, or local service provider was changed without customer authorization. Once complaint module 34 determines this, complaint module 34 then needs to enter information into the correct data field 44, 46, or 48. Such information as CIC codes may be retrieved from the customer account information or databases 24 or 26 so the customer will not need to know codes for the telephone companies and will not need to have their telephone bill in front of them. Once complaint module 34 has determined the type of slam, complaint module 34 needs to prompt the customer as to how the customer wants to resolve the slam. Complaint module 34 can prompt the customer to keep the current service provide, switch to a new service provider, or switch back to the customer's previous service provider before the slam, where the previous service provider and appropriate service provider codes are available in the customer account information.

At step 136 when complaint module 34 has received all the necessary and required customer complaint information from the customer and entered such information into complaint interface 32, complaint module 34 provides the customer with an indication or statement of outcome detailing all the actions and resolutions taken during the telephone call and the telephone call ends with the customer reporting the slamming or cramming and resolving the complaint without having to speak with a CSR.

Even though the telephone call ends at step 136, reporting system 10 continues to store and analyze the customer complaint information at step 138. Complaint module 34 updates databases 24 and/or 26 with information regarding the customer slamming and cramming complaints so that the slamming and cramming information is readily available for reports required by the state and federal regulations.

In addition to just storing the customer complaint information, complaint module 34 also analyzes the customer complaint information. Complaint module 34 tracks the frequency of offending companies that slam and cramming products or services to determine which telephone companies are more likely to slam and which product or services are more likely to be crammed. Tracking the frequent slammers and cramming products or services allows for a more responsive and user-friendly reporting system 10. Knowing which telephone companies frequently slam customers or which products or services are frequently crammed improves the speech recognition capabilities of reporting system 10. Many of the telephone companies have similar names and many of the services or products also have similar names and include the word call such as Call Waiting, Caller ID, Call Forwarding, and Three-way Calling. By keeping a frequency count of the most frequent offenders, probabilities can be assigned to specific telephone companies, products, and services based on the frequency of offense that will guide the speech recognition interface as to how to interpret the responses provided by the customers when providing customer responses and therefore decrease the number of recognition errors when customers speak their responses.

In addition, if menus or lists are used in the dialogue between reporting system 10 and the customer, such as prompting a customer to select a crammed service from a list, then the list of services may also be ordered by frequency of offense so that the services that are often crammed are listed first. Therefore, frequency data is used for assignment of probabilities for speech recognition capabilities and for the ordering of menu items. The ordering of the menu items and the probabilities may be changed dynamically by reporting system 10 based on changes in the frequencies of offense so that the ordering and probabilities are in step with the most current slamming and cramming data.

Throughout the method illustrated in FIG. 3, the customer always has the option to exit reporting system 10 and speak directly to a CSR. This option is typically given at every step of the process but may also be reserved for situations where complaint module 34 is experiencing difficulty in understanding the customer responses or situations beyond the scope of reporting system 10.

Although the above method in FIG. 3 has been described in detail, it should be understood that various alterations may be made to the operation of reporting system 10. For instance, instead of obtaining the customer telephone number using identification means and extrapolating as to the type of customer complaint based on the customer account information, complaint module 34 may simply just prompt the customer for all necessary information including customer telephone number, type of customer complaint, and specific information regarding the customer complaint resulting in the automated reporting of customer slamming and cramming complaints without involving a CSR.

Although the present invention has been described in detail, it should be understood that various changes, substitutions and alterations can be made hereto without parting from the spirit and scope of the invention as defined by the appended claims.

What is claimed is:
1. A system comprising:
an interactive response subsystem coupled to provide automated interaction with a caller; and
a complaint handling subsystem coupled to the interactive response subsystem, the complaint handling subsystem comprising:
a processor;
memory operably coupled to the processor; and a program of instructions capable of being stored in the memory and executed by the processor, the program of instructions comprising instructions to:
  detect and obtain confirmation of unauthorized changes to accounts associated with callers;
  track frequency information indicative of a frequency of the unauthorized changes; and
  use the frequency information to interpret responses provided by callers.

2. The system of claim 1, further comprising a call distribution subsystem coupled to route calls to the interactive response subsystem.

3. The system of claim 1, wherein the interactive response subsystem comprises an interactive voice response subsystem to provide voice interaction with the caller.

4. The system of claim 1, further comprising:
  an automated number identification subsystem coupled to determine a telephone number of the caller and provide the telephone number of the caller to the complaint handling subsystem; and
  wherein the program of instructions further comprises at least one instruction to obtain account information based on the telephone number.

5. The system of claim 1, wherein the program of instructions further comprises at least one instruction to undo confirmed unauthorized changes.

6. A method comprising:
  receiving a call from a caller using an interactive response system;
  responsive to determining that an account associated with the caller includes an unauthorized change, wherein the unauthorized change is selected from a change of a communications carrier associated with an account of the caller and an addition of a communications service to the account, tracking frequency information indicative of a frequency of unauthorized changes; and
  using the frequency information to interpret responses by subsequent callers.

7. The method of claim 6, further comprising providing voice interaction with the caller via an interactive voice response system.

8. The method of claim 6, further comprising:
  determining a telephone number of the caller using an automated number identification system; and
  obtaining information for the account based on the telephone number.

9. The method of claim 6, further comprising undoing an account change after the caller confirms that the account change is an unauthorized change.

10. The method of claim 6, wherein the unauthorized change is selected from a change of the communications carrier within a first time period and an addition of the communications service within a second time period.

11. The method of claim 10, wherein determining that the account includes the unauthorized change comprises electronically determining that the account includes the unauthorized change.

12. The method of claim 11, wherein the first time period and the second time period are of equal duration.

13. The method of claim 11, wherein the first time period is six months.

14. A program product comprising computer executable instructions, stored on a tangible computer readable medium, for handling cramming and slamming complaints, the computer executable instructions comprising instructions to:
  interact with a caller to identify and confirm an unauthorized change in an account of the caller wherein the unauthorized change is selected from a change of a communications carrier associated with the account and a change to a set of communications services associated with the account;
  track frequency information indicative of a parameter selected from a frequency with which confirmed unauthorized changes are associated with a communication carrier and a frequency with which confirmed unauthorized changes are associated with a communications service; and
  use probabilities derived from the frequency information to interpret responses by subsequent callers.

15. The program product of claim 14, further comprising instructions to provide voice interaction with the caller.

16. The program product of claim 14, further comprising instructions to:
  determine a telephone number of the caller using an automated number identification system; and
  obtain information for the account based on the telephone number.

17. The program product of claim 14, further comprising instructions to undo the unauthorized change.

18. The program product of claim 14, wherein the instructions to interact with the caller to identify and confirm include instructions to determine whether a change has occurred, wherein the change is selected from a communications carrier associated with the account being changed within a first time period and a communications service being added to the account within a second time period.

19. The program product of claim 18, wherein a duration of the first time period and a duration of the second time period are equal.

20. The program product of claim 18, wherein the first time period is six months.

* * * * *